United States Patent
Monteiro

(10) Patent No.: US 7,228,359 B1
(45) Date of Patent: *Jun. 5, 2007

(54) METHODS AND APPARATUS FOR PROVIDING DOMAIN NAME SERVICE BASED ON A CLIENT IDENTIFIER

(75) Inventor: Anthony J. Monteiro, North Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 10/074,548

(22) Filed: Feb. 12, 2002

(51) Int. Cl.
*G06F 15/16* (2006.01)
(52) U.S. Cl. ............................ 709/245; 709/228
(58) Field of Classification Search ............. 709/201, 709/203, 227, 228, 245
See application file for complete search history.

(56) References Cited

U.S. PATENT DOCUMENTS

| | | | | |
|---|---|---|---|---|
| 6,115,752 A | * | 9/2000 | Chauhan | 709/241 |
| 6,118,784 A | * | 9/2000 | Tsuchiya et al. | 370/401 |
| 6,154,777 A | * | 11/2000 | Ebrahim | 709/227 |
| 6,185,598 B1 | * | 2/2001 | Farber et al. | 709/200 |
| 6,304,913 B1 | * | 10/2001 | Rune | 709/241 |
| 6,338,082 B1 | | 1/2002 | Schneider | |
| 6,513,061 B1 | * | 1/2003 | Ebata et al. | 709/203 |
| 6,580,717 B1 | * | 6/2003 | Higuchi et al. | 370/401 |
| 6,728,767 B1 | * | 4/2004 | Day et al. | 709/223 |
| 2002/0038360 A1 | * | 3/2002 | Andrews et al. | 709/223 |
| 2002/0147929 A1 | | 10/2002 | Rose | |
| 2003/0065763 A1 | * | 4/2003 | Swildens et al. | 709/224 |
| 2003/0093523 A1 | * | 5/2003 | Cranor et al. | 709/225 |

OTHER PUBLICATIONS

Shaikh et al.; IBM Research Report On the Effectiveness of DNS-based Server Selection; Jun. 2000.*
Mockapetris; RFC 1034—Domain Names—Concepts and Facilities; 1987.*
Mockapetris; RFC 1035—Domain Names—Implementation and Specification; 1987.*
Davis et al.; RFC 1876—A Means for Expressing Location Information in the Domain Name System Status of this Memo; 1996.*
Moore et al.; SONAR—A Network Proximity Service; 1996.*

(Continued)

*Primary Examiner*—Krisna Lim
*Assistant Examiner*—Sean Reilly
(74) *Attorney, Agent, or Firm*—BainwoodHuang

(57) ABSTRACT

A content distribution system has a DNS server which is configured to provide DNS responses in response to DNS requests, and a device which interconnects between a client and the DNS server. The device includes an interface which communicates with the client, and a controller coupled to the interface. The controller can intercept a first DNS request en route from the client to the DNS server, and provide a second DNS request to the DNS server through the interface in response to interception of the first DNS request. The second DNS request selectively includes a client identifier which identifies the client, and not including the client identifier which identifies the client, based on a selection decision. The controller can further convey a DNS response from the DNS server to the client through the interface. The DNS response includes a content server identifier which identifies a content server.

16 Claims, 8 Drawing Sheets

OTHER PUBLICATIONS

Fei et al.; A Novel Server Selection Technique for Improving the Response Time of a Replicated Service; 1998.*

Guyton et al.; Location Nearby Copies of Replicated Interent Servers; 1995.*

US Appl. No. 10/093,579, filed Mar. 7, 2002.

Network Working Group, RFC: 3568, "Known CN Request-Routing Mechanisms", Jul. 2003, www.ietf.org/rfc/rfc3568.txt.

* cited by examiner

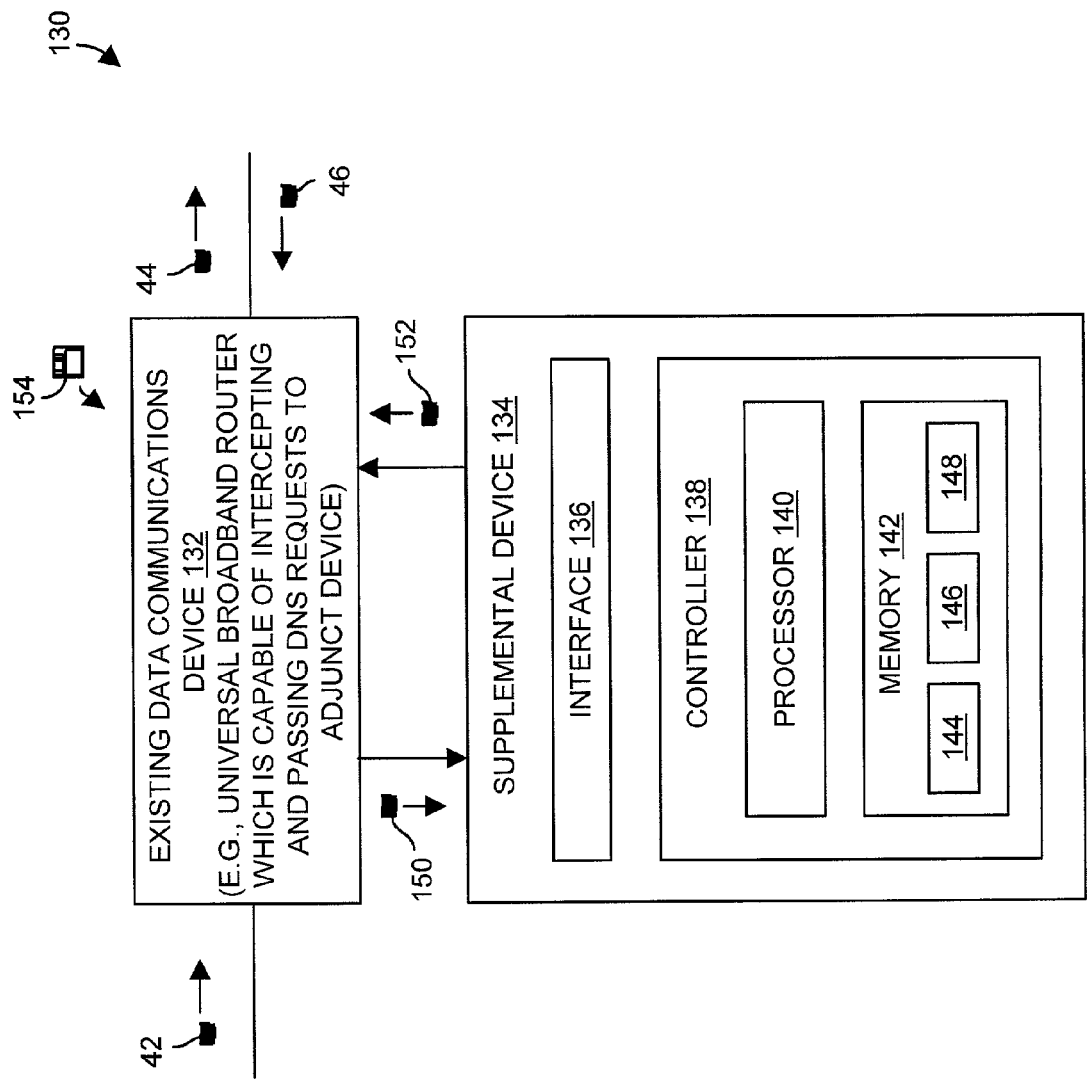

METHODS AND APPARATUS FOR PROVIDING DOMAIN NAME SERVICE BASED ON A CLIENT IDENTIFIER

BACKGROUND OF THE INVENTION

A conventional content delivery network (CDN) includes, among other things, a set of content servers and a set of CDN request handlers. The content servers typically store and provide content to clients on behalf of the hosted domains (e.g., provides web content to computers running browser applications in response to HTTP requests). The CDN request handlers, which are commonly referred to as content routers, typically provide Internet addresses to enable the clients to properly identify particular content servers within the CDN. Further details of how content routers provide such Internet addresses will now be provided.

Generally, when a CDN client (i.e., a web browser) wishes to obtain content from a hosted domain, the client begins by sending a Domain Name System (DNS) request for the desired domain name to a DNS proxy server. The DNS proxy server (perhaps through other DNS proxy servers) communicates with content router on behalf of the client in order to obtain an IP address of a content delivery site of the hosted domain. In particular, the DNS proxy server sends, to the content router, a DNS request containing the Internet Protocol (IP) address of the DNS proxy server but not containing the IP address of the client. The content router typically responds to the DNS request by selecting and returning the IP address of a content delivery site that is closest to the DNS proxy server. Accordingly, in this conventional approach, when clients are near the DNS proxy server from a network perspective, the content router selects content delivery sites which are close to the clients.

SUMMARY OF THE INVENTION

Unfortunately, there are deficiencies to the above-described conventional approach to selecting the content server which is closest to the DNS proxy server. For example, there are many situations in which there is no guarantee that the DNS proxy server is near the client. Rather, in some situations, there is no correlation between the location of the DNS proxy server and the location of the client. Such a situation exists when the DNS proxy server belongs to an Internet Service Provider (ISP) which has centralized DNS proxies. Here, the clients can be distributed over a wide area (e.g., the United States) and all of the DNS proxy servers can be located at a single location (e.g., Texas). As a result, the content router may select a content server which is near a DNS proxy (e.g., Texas) but far from the client (e.g., Massachusetts).

The invention is directed to techniques which provide domain name service based on a client identifier that identifies a client. For example, the domain name section of DNS requests can be modified to include embedded client identifiers. Accordingly, when there are multiple content servers that are capable of providing content to a client, a DNS server (e.g., a content router) can select the content server which is closest to the client using the client identifier which identifies the client. Such content routing based on the client identifier provides improved accuracy over the above-described conventional approach of selecting the content server which is closest to the DNS proxy server.

Furthermore, inclusion of the client identifier in the domain name section of the DNS request is more practical and feasible than other possible alternatives such as constructing a new DNS protocol for DNS requests (e.g., a DNS request which would include a new dedicated section for the client IP address, the new dedicated section being different than the domain name section or the source address section which would contain the IP address of the DPROXY device). Protocol changes are typically out of control of any one company or manufacturer, and typically requires agreement among major sponsors, an outcome which is often difficult to achieve.

In accordance with the invention, a data communications device (e.g., a router) operating within a CDN can intercept requests from clients. For example, the data communications device can intercept messages to UDP/IP, port 53, and direct them to specially configured circuitry. When a message is not a DNS request for a domain hosted by the CDN, the specially configured circuitry can simply forward the message using standard routing tables as if the message were not intercepted. However, if the message is a DNS request for a domain hosted by the CDN, the specially configured circuitry can create a second DNS request to replace the original DNS request. This second DNS request can include the requested domain name as well as the client IP address (e.g., encoded with a special flag in the domain name section for compatibility with standard DNS requests so that intermediate DNS servers can handle the request without requiring special hardware or software).

In one embodiment, the data communications device forwards the second DNS request via standard routing tables to the destination of the original client DNS request such as the client's DNS proxy server. The DNS proxy server then uses the usual DNS resolution methods, and eventually sends a DNS request to a specialized DNS server. This specialized DNS server identifies the special flag and decodes the client IP address thus allowing the DNS server to make a routing decision using the client IP address, rather than the IP address of the DNS proxy server.

In another embodiment, the data communications device is configured with the IP addresses of the DNS servers, and directly sends the second DNS request to a DNS server thus enabling the DNS request to be handled faster. In this embodiment, the DNS server can respond directly to the data communications device (rather than through a DNS proxy server) thus avoiding additional communications overhead.

One embodiment of the invention is directed to a content distribution system having a DNS server (e.g., a content router) which is configured to provide DNS responses in response to DNS requests, and a data communications device which is capable of interconnecting between a client and the DNS server. The data communications device includes an interface which is capable of communicating with the client, and a controller coupled to the interface. The controller is configured to intercept a first DNS request from the client, and provide a second DNS request to the DNS server through the interface in response to interception of the first DNS request. The second DNS request selectively (i) includes a client identifier which identifies the client (e.g., the Internet address of the client), and (ii) not including the client identifier which identifies the client, based on a selection decision. The controller is further configured to convey a DNS response from the DNS server to the client through the interface. The DNS response includes a content server identifier which identifies a content server. When the client identifier is included in the second DNS request, the DNS server can perform a content routing operation based on the client identifier (e.g., can select the content server which is closest to the client) in order to improve content routing accuracy.

In one arrangement, the second DNS request includes a domain name field (or domain name portion). In this arrangement, the controller includes processing circuitry that selectively (i) includes the client identifier in the domain name field of the second DNS request, and (ii) does not include the client identifier in the domain name field of the second DNS request, based on the selection decision, in order to provide the second DNS request. In this arrangement, no other changes to the DNS request format is required, and the DNS server can simply parse the domain name field of the second DNS request in order to obtain the client identifier.

In one arrangement, the processing circuitry is further configured to include a flag in the domain name field of the second DNS request when the client identifier is included in the domain name field of the second DNS request, and not include the flag in the domain name field of the second DNS request when the client identifier is not included in the domain name field of the second DNS request. In this arrangement, the DNS server can scan or search the domain name field of the second DNS request for the flag. If the DNS server finds the flag, the DNS server then extracts the client identifier from the domain name field and perform a content routing operation based on the client identifier. However, if the DNS server does not find the flag, the DNS server can then handle the second DNS request in a conventional manner (e.g., perform a content routing operation based on a DNS proxy Internet address contained within the second DNS request).

In one arrangement, the first DNS request includes a domain name field which contains a domain name. In this arrangement, the controller includes processing circuitry which is configured to generate, as the selection decision, a result having a first value when the domain name belongs to a predetermined group of domain names and a second value when the domain name does not belong to the predetermined group of domain names. Preferably, the controller further includes memory coupled to the processing circuitry. The memory stores a list of domain names (e.g., a list of domain names hosted by the CDN). The processing circuitry is further configured to access the list of domain names stored in the memory to determine whether the list of domain names includes an entry having the domain name, the domain name belonging to the predetermined group of domain names when the list of domain names includes an entry having the domain name, and the domain name not belonging to the predetermined group of domain names when the list of domain name does not include an entry having the domain name. Accordingly, the controller can control whether to include the client identifier in the second DNS request based on whether the contents of the domain name field of the first DNS request (i.e., the requested content) is listed in a data structure (e.g., a table) in the memory.

The features of the invention, as described above, may be employed in CDN systems, devices and methods as well as other computer-related components such as those of Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a block diagram of an alternative configuration for the data communications device of the content distribution network of FIG. 1.

DETAILED DESCRIPTION

The invention is directed to techniques which provide domain name service (DNS) based on a client identifier that identifies a client (e.g., an Internet address of a computer running a browser application). For example, when there are multiple content servers that are capable of providing content to a client, a DNS server can select the content server which is closest to the client using the client identifier which identifies the client. Such content routing based on the client identifier provides improved accuracy over a conventional approach of selecting the content server which is closest to a DNS proxy in which the client may be far away from the DNS proxy.

Figure 1:
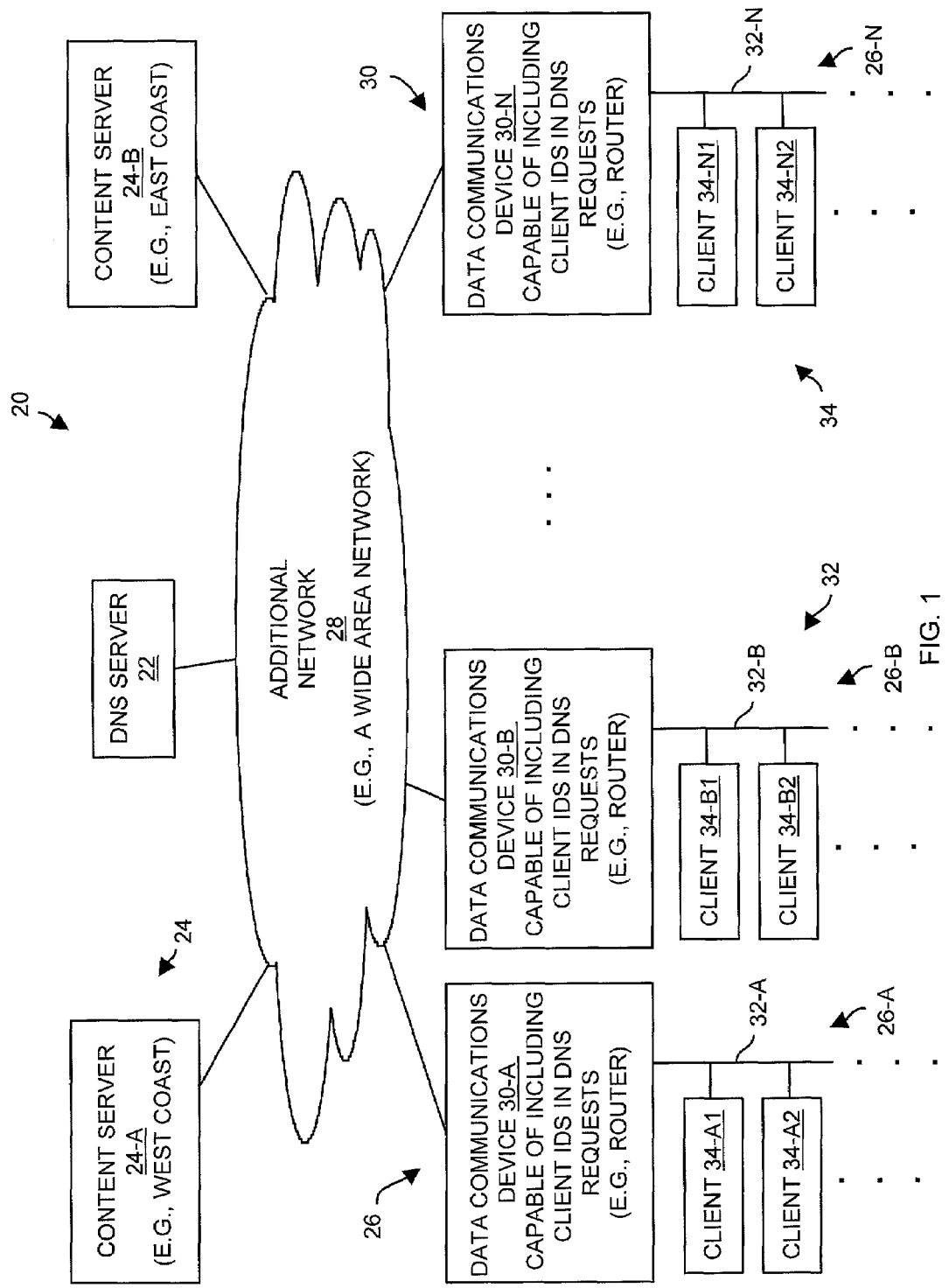
FIG. 1 is a block diagram of a content distribution network which is suitable for use by the invention.

FIG. 1 shows a content distribution network (CDN) 20 which is suitable for use by the invention. The CDN 20 includes a DNS server 22 (e.g., a specially configured DNS controller or content router), multiple content servers 24 (e.g., content servers 24-A, 24-B), multiple network portions 26 and additional network 28 (e.g., a wide area network or WAN). Each network portion 26 includes, by way of example only, a data communications device 30 (e.g., a universal broadband router at the cable head end) and communications media 32 (e.g., cable for broadband communications). Clients 34 can connect to each network portion 26. For example, the network portion 26-B includes a data communications device 30-B and communications media 32-B, and multiple clients 34-B1, 34-B2, . . . connect to the CDN 20 at the communications media 32-B of the network portion 26-B.

Network traffic exchanged between the clients 34 of each network portion 26 and the additional network 28 (e.g., packets exchanged between the clients 34 and the DNS server 22, and exchanged between the clients 34 and the content servers 24) must pass through the data communications devices 30. For example, in order for the client 34-B1 to communicate with a device in the additional network 28, the client 34-B1 transmits and receives packets which pass through the data communications device 30-B.

During operation of the CDN 20, the clients 34 obtain content from the content servers 24-A, 24-B which, for at least one host domain, store and provide the same content (e.g., operate as mirror sites for that host domain). To this end, the clients 34 send DNS requests to the data communications devices 30. The DNS requests from the clients 34 include domain names for content and the Internet addresses of the clients 34 in order to identify the sources of the DNS requests. In particular, the data communications devices 30 repackage the initial client DNS requests, into second DNS requests which include the domain names for the content and the Internet addresses of the data communications devices 30. However, the data communications devices 30 are capable of further including the Internet addresses of the clients 34 in the second DNS requests in order to enable the DNS server 22 to subsequently perform content routing operations based on the locations of the clients 34. Such operation provide more accurate content routing than the conventional approach of resolving domain names into content server Internet addresses based on locations of the DNS proxies (which may be far away from the clients). Further details of how this takes place will now be provided with reference to FIG. 2.

Figure 2:
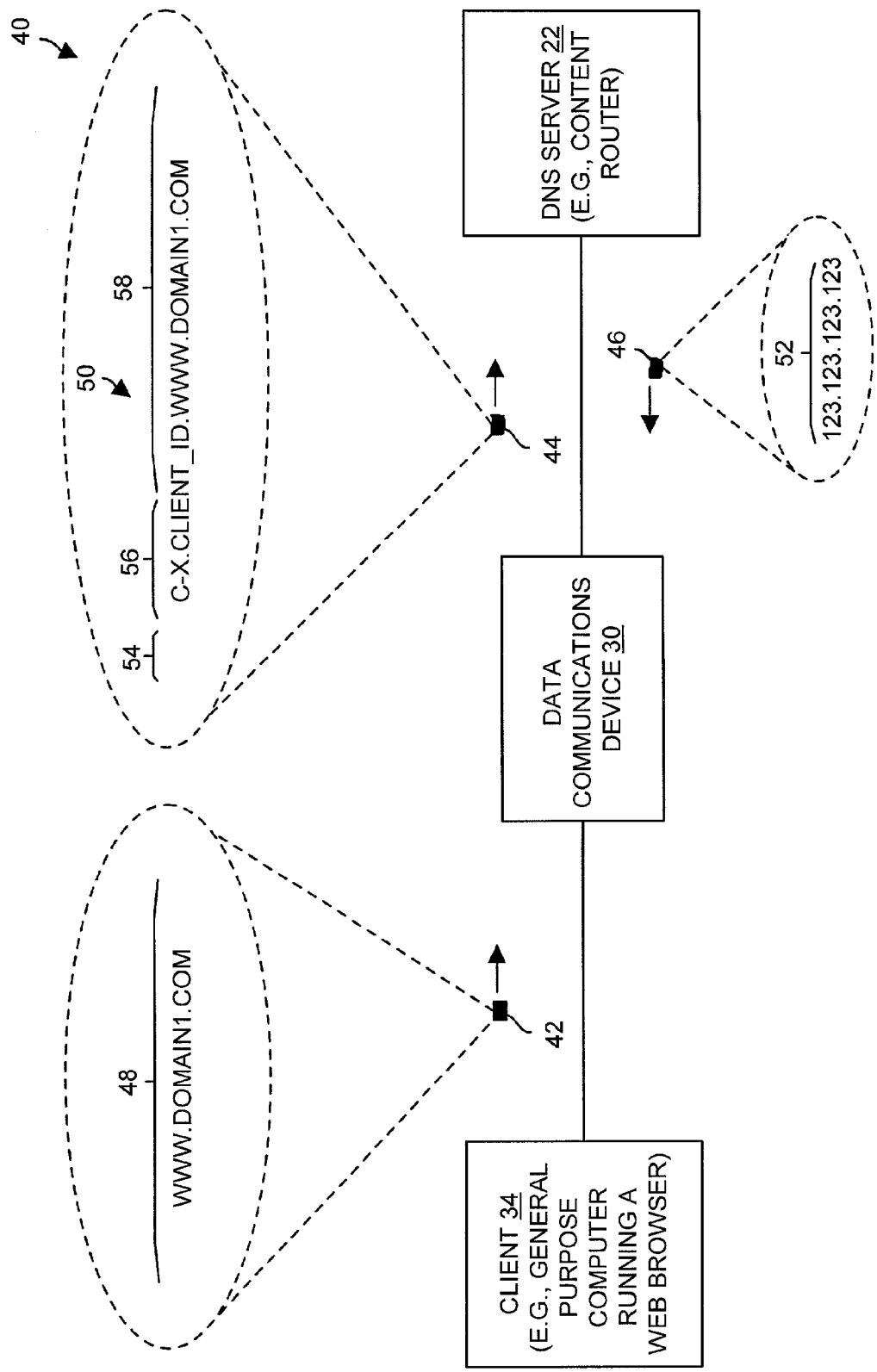
FIG. 2 is a block diagram of particular components of the content distribution network of FIG. 1 and communications which are exchanged by these components.

FIG. 2 shows a block diagram 40 of particular components of the CDN 20 which are involved in a DNS operation. In particular, FIG. 2 shows a client 34, a data communications device 30 and the DNS server 22.

In order for the client 34 to obtain resolution of a domain name, the client 34 sends a DNS request 42 to the data communications device 30. The DNS request 42 includes, among other things, a domain name section 48 and a source address section. The contents of the domain name section 48 contains a domain name identifying the domain (e.g., "www.domain1.com") and the contents of the source address section include a client identifier (i.e., the Internet address of the client 34) identifying the client 34 as the source of the DNS request 42. The data communications device 30 receives the DNS request 42, and generates a second DNS request 44 which it sends to the DNS server 22. The second DNS request 44 includes, among other things, a domain name section 50 and a source address section. The contents of the domain name section 50 contains a flag 54 (e.g., "C-X"), the client identifier or CLIENT_ID 56 (e.g., an Internet address having the form "AAA.BBB.CCC.DDD") identifying the client 34 (e.g., the Internet address of the client 34), and the domain name 58 identifying the domain (e.g., "www.domain1.com").

The DNS server 22 receives the second DNS request 44 from the data communications device 30, and resolves the domain name field (e.g., "www.domain1.com") contained within the domain name section 50 of the DNS request 44 into an Internet address of a content server 24 which is capable of providing content identified by the domain name field. The DNS server 22 then provides a DNS response 46 containing, in a target Internet address section 52, the Internet address of that content server 24.

If there is only one content server 24 which can provide that content, the DNS server 22 provides the Internet address of that content server 24. However, if there are multiple content servers 24 which can provide that content, the DNS server 22 preferably provides the Internet address of the content server 24 which is closest to the client 34. Since the client identifier 56 is contained within the domain name section 50 of the DNS request 44, the DNS server 22 can select the closest content server 24 to the client 34. The DNS server 22 does not have to rely on the location of the DNS proxy (i.e., the location of the data communications device 30) on which to base its decision. For example, if the client 34 is on the West Coast, the DNS server 22 can direct the client to the content server 24-A on the West Coast rather than the content server 24-B on the East Coast, regardless of the location of the DNS proxy (e.g., in Texas). Accordingly, content routing using the client identifier is more accurate than the earlier-described conventional approach of content routing based on the Internet address of the DNS proxy. Further details of the invention will now be provided with reference to FIGS. 3 and 4.

Figure 3:
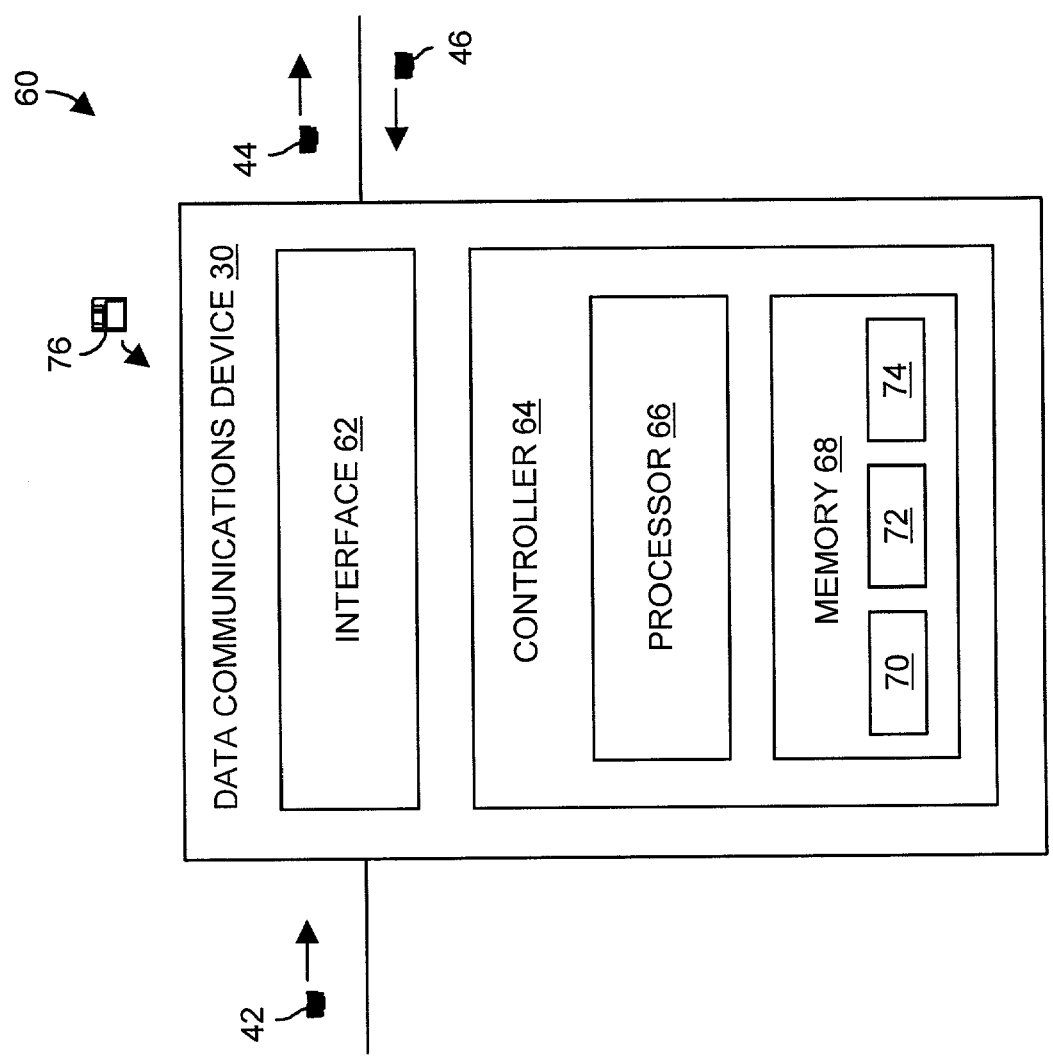
FIG. 3 is a block diagram of a data communications device of the content distribution network of FIG. 1.

FIG. 3 is a detailed block diagram 60 of the data communications device 24. As shown, the data communications device 24 includes an interface 62 and a controller 64 which is coupled to the interface 62. The controller 64 includes a processor 66 (i.e., processing circuitry) and memory 68 coupled to the processor 66. The memory 68 stores an operating system 70, an application 72 and a data structure 74. One or more of the operating system 70, the application 72 and the data structure 74 can be transferred and loaded into the memory 68 on a computer program product 76 which includes a computer readable medium having instructions and data stored thereon (e.g., a set of diskettes, tapes, CD-ROMs). Alternatively, these memory constructs can be obtained in the form of one or more propagated signals (e.g., as a network download).

During operation, the processor 66 executes the operating system 70 and the application 72. Execution of the operating system 70 enables management of resources (e.g., context switching between routing processes, a monitoring process, and a user process). Execution of the application 72 enables the data communications device 24 to selectively include or not include the client identifier within the second DNS request 44 to the DNS server in response to the initial DNS request 42 from the client 34. Such selectivity is determined by information within the data structure 74. The application 72 running on the processor 66 effectively forms a client-side agent for DNS content routing, i.e., for including a client identifier in the second DNS request 44 so that DNS resolution can result in selection of content servers 24 which are the closest to the clients 34.

Figure 4:
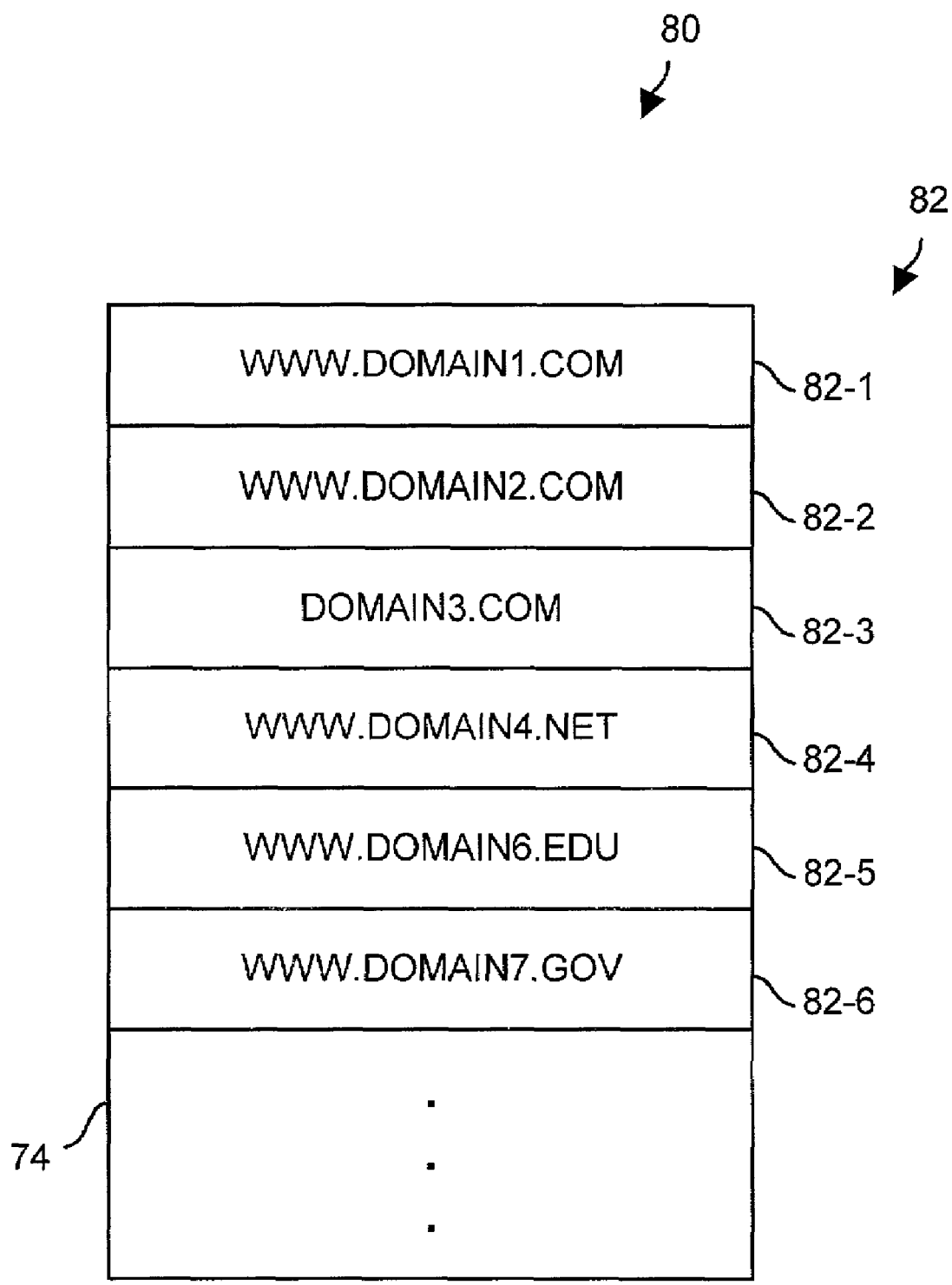
FIG. 4 is a domain table which is suitable for use by the data communications device of FIG. 3.

FIG. 4 shows a detailed view 80 of the data structure 74. The data structure 74 can be logically illustrated as a table of entries 82-1, 82-2, . . . (collectively, entries 82). Each entry 82 stores a domain name so that the table of entries 82 is essentially a list of the domain names that are served by the CDN 20 using content routing based on client identifiers. For example, the entry 82-1 stores the domain name "www.domain1.com", the entry 82-2 stores the domain name "www.domain2.com", and so on.

When the data communications device 24 receives a DNS request 42 from a client 34, the data communications device 24 checks the domain name field in the domain name section of the DNS request 42 with the table of entries 82. If there is no match, the data communications device 30 does not include the client identifier of the client 34 in the second DNS request 44 (i.e., the second DNS request 44 takes a standard form). However, if there is a match, the data communications device 30 includes the client identifier in the second DNS request 44. That is, when the controller 64 of the data communications device 24 receives the DNS request 42 through the interface 62 (see FIG. 3), the processor 66 looks in the data structure 74 to see whether the domain name in the DNS request 42 is stored as an entry 82 in the data structure 74. If the domain name is not stored in the data structure 74, the data communications device 24 generates the second DNS request 44 without the client identifier. However, if the domain name is stored in the data structure 74, the data communications device 24 is authorized to generate the second DNS request 44 so that it includes the client identifier.

Accordingly, the data communications device 24 can be configured to selectively include, or not include, the client identifier in the second DNS request 44 by adding an entry 82 or not adding an entry containing the domain name in the data structure 74. For example, a user (e.g., a CDN administrator) can configure the data communications device 24 to include client identifiers in DNS requests for the domain name "www.domain6.edu" by adding an entry 82 to the data structure 74 containing that domain name (see entry 82-5 in FIG. 4). If the user later wishes to disable inclusion of client identifiers for that domain name, the user can simply remove that entry 82 from the data structure 74.

It should be understood that the second DNS request 44 can take a standard form when the domain name of the initial DNS request 42 does not match an entry 82 in the table of FIG. 4. Accordingly, the techniques of the invention are elegant, easy to implement, and compatible with the existing DNS architecture, protocols and servers. Further details of the invention will now be provided with reference to FIG. 5.

Figure 5:
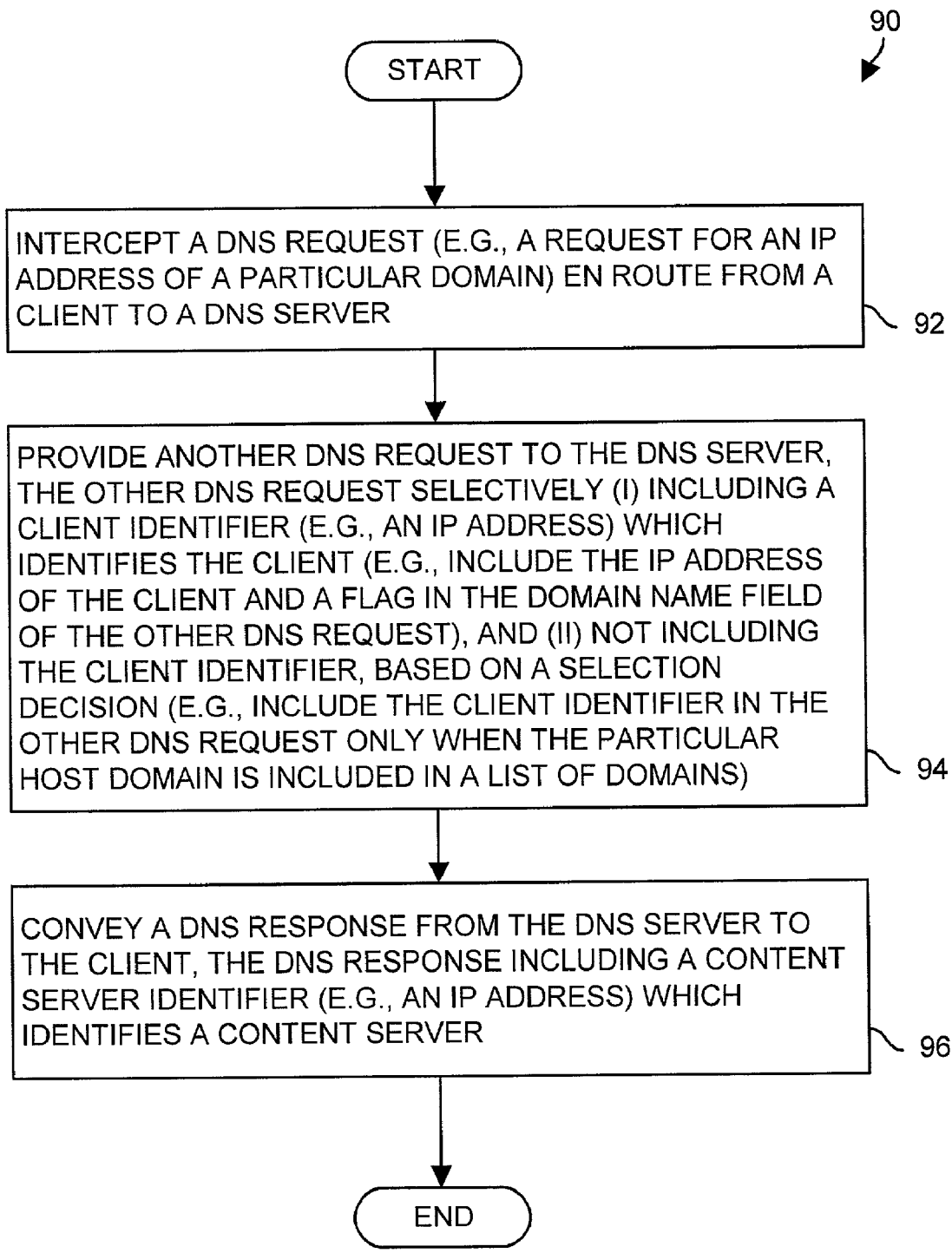
FIG. 5 is a flowchart of a procedure which is performed by the data communications device of FIG. 3.

FIG. 5 shows a procedure 90 which is performed by the data communications device 24 during normal operation (i.e., performed by the client-side agent). In step 92, the data communications device 30 intercepts a DNS request en route from a client 34 to the DNS server 22 (also see FIG. 2). For example, in the process of obtaining web content from a content server 24, the client 34 initially sends a DNS request 42 requesting an Internet address for a particular domain name.

In step 94, the data communications device 30 provides another DNS request 44 to the DNS server 24. The other DNS request 44 selectively (i) includes a client identifier which identifies the client 34 (e.g., the Internet address of the client 34), and (ii) does not include the client identifier based on a selection decision. In particular, the data communications device 30 generates the selection decision by checking its data structure 74 to determine whether the particular hosted domain identified by the initial DNS request 42 is contained within an entry 82 of the data structure 74. If the hosted domain is stored in the data structure 74, the selection decision directs the data communications device 30 to include the client identifier in the second DNS request 44. However, if the hosted domain is not stored in the data structure 74, the selection decision directs the data communications device 30 not to include the client identifier in the second DNS request 44.

In step 96, the data communications device 30 conveys a DNS response 46 from the DNS server to the client 34. The DNS response includes a content server identifier which identifies the content server 34 (e.g., an Internet address of a content server 24). If the content routing operation of the DNS server 22 is based on a client identifier contained within the second DNS request 44, the content routing operation is more accurate (e.g., selection of the content server 24 from multiple content servers 24 is made so that the selected content server 24 is the closest content server 34 to the client). Accordingly, the client 34 now can optimally obtain the content from that content server 34. Further details of the invention will now be provided with reference to FIGS. 6 and 7.

Figure 6:
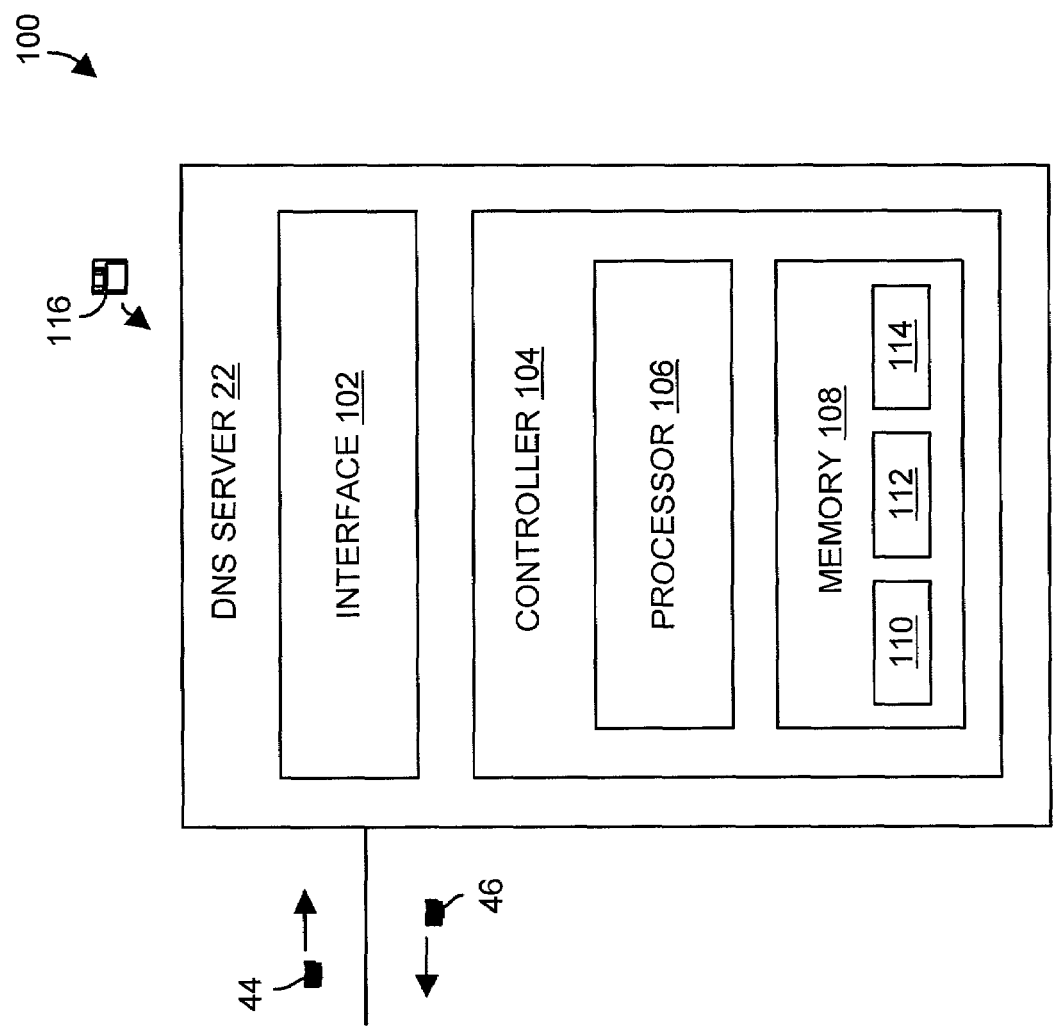
FIG. 6 is a block diagram of a domain name service server of the content distribution network of FIG. 1.

FIG. 6 shows a detailed view 100 of the DNS server 22. As shown, the DNS server 22 includes an interface 102 and a controller 104 which is coupled to the interface 102. The controller 104 communicates with external devices (e.g., the data communications devices 30) through the interface 102. The controller 104 includes a processor 106 and memory 108 which is coupled to the processor 106. The memory 108 stores an operating system 110, an application 112 and a DNS database 114. One or more of the operating system 110, the application 112 and the DNS database 114 can be transferred and loaded into the memory 108 on a computer program product 116 which includes a computer readable medium having instructions and data stored thereon (e.g., a set of diskettes, tapes, CD-ROMs, etc.). Alternatively, such memory constructs can be obtained in the form of one or more propagated signals (e.g., via a network download). In one arrangement, the DNS database 114 has knowledge of network distances between clients 34 and content servers 24 due to periodic or occasional probes (e.g., time measured pings between devices for proximity measurements).

During operation, the processor 106 (i.e., processing circuitry) executes the operating system 110 and the application 112. Execution of the operating system 110 enables management of resources (e.g., context switching between routing processes, a monitoring process, and a user process). Execution of the application 112 enables the DNS server 22 to perform content routing operations such as resolving DNS requests into Internet addresses. For example, suppose that the CDN 20 includes multiple content servers 24 which are capable of providing particular content identified in a DNS request. The DNS server 22 can determine, in accordance with the application 112, whether a DNS request 44 (from a DNS proxy such as a data communications device 30) for the particular content includes a client identifier identifying a client. In one arrangement, the domain name section of the DNS request 44 can include an embedded client identifier and an embedded flag which is detectable by the DNS server 22.

If the DNS request 44 includes the client identifier, the processor 106 of the DNS server 22 can access the DNS database 114 and select the content server 24 which is closest to the location of the client. If the DNS request 44 does not include the client identifier, the processor 106 of the DNS server 22 can access the DNS database 114 and select the content server 24 in a traditional manner (e.g., choose the content server 24 which is closest to the location of the DNS proxy). Accordingly, the DNS server 22 is capable of providing more accurate content routing (e.g., DNS resolution to select content servers 24 closest to the clients) when the DNS requests 44 include client identifiers.

Figure 7:
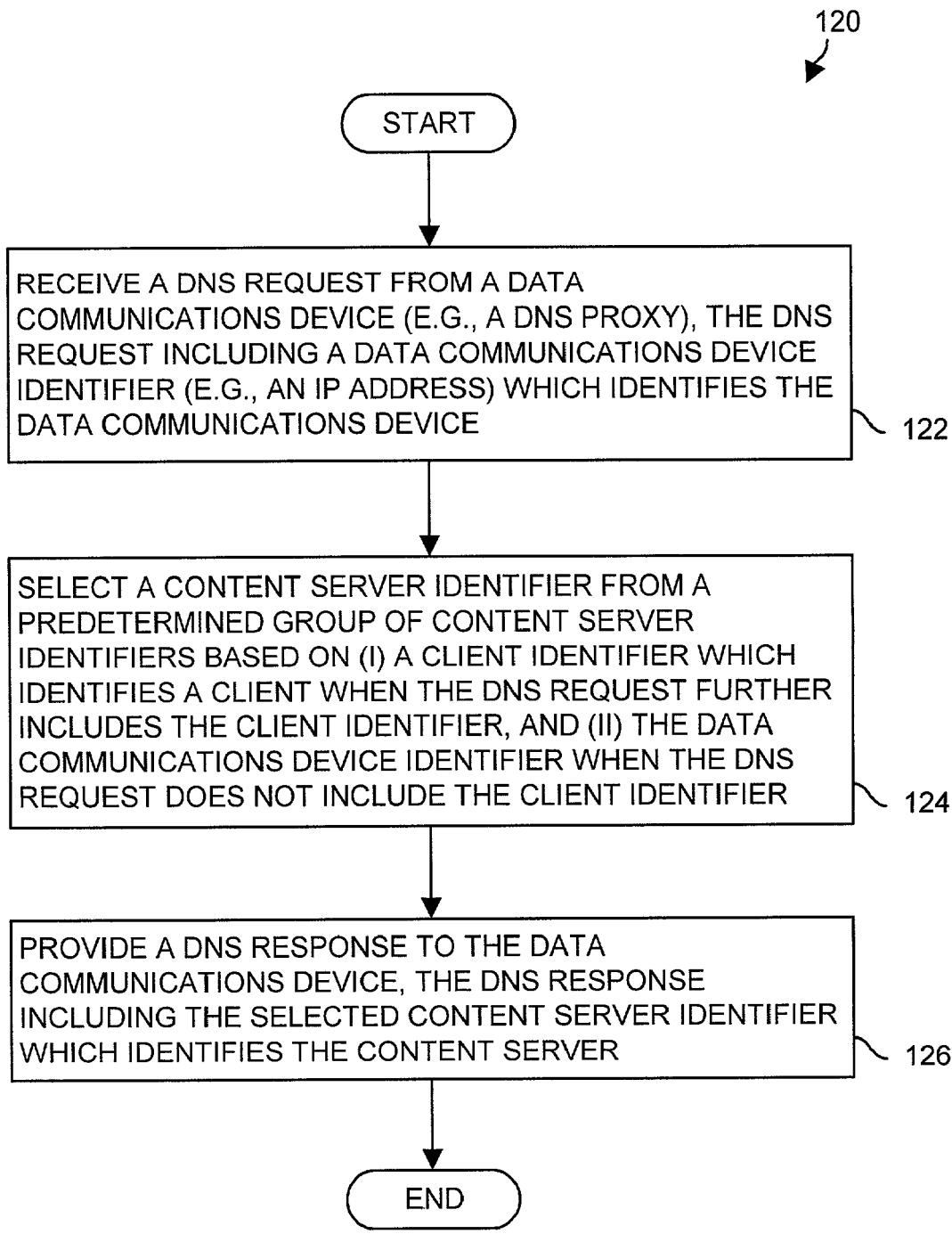
FIG. 7 is a flowchart of a procedure which is performed by the domain name service server of FIG. 6.

FIG. 7 shows a procedure 120 which is performed by the DNS server 22 during normal operation. In step 122, the DNS server 22 receives the DNS request 44 from a data communications device 30 (i.e., a DNS proxy). The DNS request 44 includes a data communications device identifier identifying the data communications device 30 (i.e., the Internet source address of the data communications device 30 which sent the DNS request 44).

In step 124, the DNS server 22 selects a content server identifier from a predetermined group of content server identifiers (i.e., from the DNS database 114) based on (i) a client identifier identifying a client when the DNS request 44 further includes the client identifier, and (ii) the data communications device identifier when the DNS request 44 does not include the client identifier. In one arrangement, the DNS server 22 searches the domain name section of the DNS request 44 for a unique flag (e.g., a unique character string). If the DNS server 22 finds the unique flag, it parses the contents of the domain name section to obtain the client identifier. However, if the DNS server 22 does not find the unique flag, it assumes that contents of the domain name section does not include the client identifier.

In step 126, the DNS server 22 provides a DNS response 46 back to the data communications device. The DNS response 46 includes the selected content server identifier which identifies the content server 24. Accordingly, the DNS server 22 is capable of performing a content routing operation which selects a content server closest to the location of the client based on a client identifier included within the DNS request 44. Further details of the invention will now be provided with reference to FIG. 8.

FIG. 8 is a block diagram 130 of an alternative configuration for a data communications device 30 of the CDN 20 of FIG. 1. The data communications device 30 can be formed from an existing data communications device 132 and a supplemental device 134 coupled to the existing data communications device 132. That is, the configuration 130 of FIG. 8 includes the client-side agent feature as a separate component in contrast to the configuration of FIG. 3 in which the client-side agent is integrated.

With reference to FIG. 8, the existing data communications device 132 can be formed from conventional data communications hardware and software which is subsequently configured to intercept and pass client DNS requests 42 to the supplemental device 134. This filtering operation can be accomplished using the WCCPV2 feature in the IOS provided by Cisco Systems, Inc. of San Jose, Calif.

The supplemental device 134 includes an interface 136 and a controller 138 which is coupled to the interface 136. The controller 138 includes a processor 140 and memory 142 coupled to the processor 140. The memory 142 stores an operating system 144, an application 146 and a data structure 148. One or more of the operating system 144, the application 146 and the data structure 148 can be transferred and loaded into the memory 142 on a computer program product 154 which includes a computer readable medium having instructions and data stored thereon (e.g., a set of diskettes, tapes, CD-ROMs, etc.). In the alternative, such memory constructs can be obtained in the form of one or more propagated signals (e.g., via a network download).

During operation, the processor 140 executes the operating system 144 and the application 146. Execution of the operating system 144 enables management of resources (e.g., context switching between routing processes, a monitoring process, and a user process). Execution of the application 146 enables the data communications device supplemental device 134 to selectively include or not include the client identifier within a second DNS request 44 to the DNS server in response to the initial DNS request 42 from a client 34. Such selectivity is determined by information within the data structure 148. FIG. 4 shows a table 80 of entries 82 containing domain names which is suitable for use as the data structure 148.

In one arrangement, the initial DNS request 42 is passed as a separate signal 150 to the supplemental device 150 (i.e., to the controller 138 through the interface 136). The second DNS request 44 is then passed as a separate signal 152 back to the existing data communications device 132 which sends it to the DNS server 22 (i.e., from the controller 138 through the interface 136). In an alternative arrangement, the existing data communications device 132 simply provides a set of control signals 150 (e.g., a client identifier and contents of the domain name section of the DNS request 42, not the entire DNS request 42) to the supplemental device 134, and the supplemental device 134 returns a set of response signals 152 (e.g., a domain name field including the initial domain name contents, an embedded client identifier, and a flag). Accordingly, the techniques of the invention can be implemented in existing data communications devices 132 provided that they are properly configured to interface with the supplemental device 134.

As described above, the invention is directed to techniques which provide domain name service based on a client identifier that identifies a client (e.g., an Internet address of a computer running a browser application). For example, when there are multiple content servers that are capable of providing content to a client, a DNS server can select the content server which is closest to the client using the client identifier which identifies the client. Such content routing based on the client identifier provides improved accuracy over a conventional approach of selecting the content server which is closest to a DNS proxy. Such techniques are compatible with the existing DNS architecture, protocols and servers. The features of the invention, as described above, may be employed in networks, network components and procedures as well as other computer-related devices such as those of Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the CDN 20 was shown as including only one DNS server 22 by way of example only. In other arrangements, the CDN 20 includes multiple DNS servers 22 in order to load balance the handling of DNS requests, for fault tolerance, and to improve distribution of such operations (i.e., for localization of such operations).

Additionally, it should be understood that the DNS requests 42, 44 were shown above as passing through only one DNS proxy device (i.e., the data communications devices 30, 130 and one DNS server 22. In some arrangements, the DNS requests 42, 44 pass through additional devices such as a root DNS server, a ".com" DNS server, a particular domain DNS server (e.g., "mydomain.com"), etc.

Furthermore, it should be understood that the network portions 26 were shown as having a multi-drop topology (e.g., a cable network topology) by way of example only. In other arrangements, the network portions 26 have different topologies such as star configurations, ring topologies, irregular layouts, backbone topologies and/or combinations thereof.

Additionally, it should be understood that the identifiers were described above as being Internet addresses, i.e., Internet Protocol (IP) addresses having the form of AAA.BBB.CCC.DDD by way of example only. In other arrangements, the identifiers have other forms and/or comply with other protocols (e.g., as unique integers, character combinations, etc.).

Furthermore, it should be understood that the DNS requests 42, 44 and DNS responses 46 can take the form of one or more data elements (e.g., packets, cells, frames, etc.). Such transmissions can occur over traditional connections or through connectionless communications.

Additionally, it should be understood that the data communications devices 30, 130 can perform standard data communications operations in addition to converting initial client DNS requests 42 into second DNS requests 44, and conveying back DNS responses 46. For example, such data communication devices 30, 130 can operate as routers, switches, hubs, bridges, gateways, etc.

Furthermore, it should be understood that the content servers 24 were described above as providing web content (e.g., web pages, JPEGs, MPEGs, AVIs, audio feeds, video feeds, etc.) by way of example only. In other arrangements, the content servers 24 provide other types of content (e.g., operates as a mail server, an FTP server, etc.).

What is claimed is:

1. A content distribution system, comprising:
a domain name service server which is configured to provide domain name service responses in response to domain name service requests; and
a data communications device which is capable of interconnecting between a client and the domain name service server, wherein the data communications device includes:
an interface which is capable of communicating with the client, and
a controller coupled to the interface, wherein the controller is configured to:
intercept a first domain name service request from the client, the first domain name service request including a domain name field having first contents being solely a host domain name that that can be resolved into a corresponding network address,
determine that the host domain name in the domain name field of the first domain name service request is included in a list of domain names associated with corresponding content servers,
provide a second domain name service request to the domain name service server through the interface in response to interception of the first domain name service request, the second domain name service request having a modified domain name field, the modified domain name field including a concatenated value including the host domain name as well as a client identifier identifying the client, such that the concatenated value does not represent a domain name that can be resolved to a network address, and
convey a domain name service response from the domain name service server to the client through the interface, the domain name service response including a content server identifier which identifies one of the content servers.

2. A data communications device, comprising:
an interface which is capable of communicating with a client; and
a controller coupled to the interface, wherein the controller is configured to:
intercept a first domain name service request from the client, the first domain name service request including a domain name field having first contents being solely a host domain name that is the subject of the domain name service request message and that can be resolved into a corresponding network address,
determine that the host domain name in the first domain name field of the domain name service request is included in a list of domain names associated with corresponding content servers,
provide a second domain name service request to a domain name service server through the interface in response to interception of the first domain name service request, the second domain name service request having a modified domain name field, the modified domain name field including a concatenated value including the host domain name as well as a client identifier identifying the client, such that the concatenated value does not represent a domain name that can be resolved to a network address, and
convey a domain name service response from the domain name service server to the client through the interface, the domain name service response including a content server identifier which identifies one of the content servers.

3. The data communications device of claim 2 wherein the processing circuitry is further configured to:
include a flag in the domain name field of the second domain name service request when the client identifier is included in the domain name field of the second domain name service request, and not include the flag in the domain name field of the second domain name service request when the client identifier is not included in the domain name field of the second domain name service request.

4. A data communications device, comprising:
an interface which is capable of communicating with a client; and
a controller coupled to the interface, wherein the controller includes:
means for intercepting a first domain name service request from the client, the first domain name service request including a domain name field having first contents being solely a host domain name that is the subject of the domain name service request message and that can be resolved into a corresponding network address,
means for determining that the host domain name in the domain name field of the first domain name service request is included in a list of domain names associated with corresponding content servers;
means for providing a second domain name service request to a domain name service server through the interface in response to interception of the first domain name service request, the second domain name service request having a modified domain name field, the modified domain name field including a concatenated value including the host domain name as well as a client identifier identifying the client, such that the concatenated value does not represent a domain name that can be resolved to a network address; and
means for conveying a domain name service response from the domain name service server to the client through the interface, the domain name service response including a content server identifier which identifies one of the content servers.

5. A method for obtaining a domain name service on behalf of a client, the method comprising the steps of:
intercepting a first domain name service request from the client, the first domain name service request including a domain name field having first contents being solely a host domain name that is the subject of the domain name service request message and that can be resolved into a corresponding network address,
determining that the host domain name in the domain name field of the first domain name service request is included in a list of domain names associated with corresponding content servers;
in response to interception of the first domain name service request, providing a second domain name service request to a domain name service server, the second domain name service request having a modified domain name field, the modified domain name field including a concatenated value including the host domain name as well as a client identifier identifying the client, such that the concatenated value does not represent a domain name that can be resolved to a network address, and conveying a domain name service response from the domain name service server to the client, the domain name service response including a content server identifier which identifies one of the content servers.

6. The method of claim 5 wherein the step of providing the second domain name service request further includes the step of:

including a flag in the domain name field of the second domain name service request when the client identifier is included in the domain name field of the second domain name service request, and not including the flag in the domain name field of the second domain name service request when the client identifier is not included in the domain name field of the second domain name service request.

7. A computer program product that includes a computer readable medium having instructions stored thereon for obtaining a domain name service on behalf of a client, such that the instructions, when carried out by a computer, cause the computer to perform the steps of:

intercepting a first domain name service request from the client, the first domain name service request including a domain name field having first contents being solely a host domain name that is the subject of the domain name service request message and that can be resolved into a corresponding network address, determining that the host domain name in the domain name field of the first domain name service request is included in a list of domain names associated with corresponding content servers;

in response to interception of the first domain name service request, providing a second domain name service request to a domain name service server, the second domain name service request having a modified domain name field, the modified domain name field including a concatenated value including the host domain name as well as a client identifier identifying the client, such that the concatenated value does not represent a domain name that can be resolved to a network address; and conveying a domain name service response from the domain name service server to the client, the domain name service response including a content server identifier which identifies one of the content servers.

8. A content distribution system according to claim 1, wherein the domain name service server comprises:

an interface which is capable of communicating with the data communications device; and a controller coupled to the interface, wherein the controller is configured to:

receive the second domain name service request from the data communications device through the interface, the domain name service request including a data communications device identifier which identifies the data communications device, parse a domain name field of the second domain name service request to determine whether the domain name field has a first contents or a second contents, the first contents being solely a host domain name that can be resolved into a corresponding network address, the second contents being solely a concatenated value including the host domain name and a client identifier identifying the client, such that the concatenated value does not represent a domain name that can be resolved into a corresponding network address;

select the content server identifier from a predetermined group of content server identifiers based on (i) the client identifier which identifies the client when the domain name field of the second domain name service request includes the second contents, and (ii) the data communications device identifier when the domain name field of the second domain name service request includes the first contents, and provide the domain name service response to the data communications device through the interface, the domain name service response having the selected content server identifier which identifies a content server.

9. A content distribution system according to claim 8, wherein the controller of the domain name service server includes:

processing circuitry which is configured to determine whether the domain name field of the second domain name service request includes a flag indicating that the domain name field includes the client identifier such that (i) selection of the content server identifier is based on the client identifier when the domain name field of the domain name service request includes the flag, and (ii) selection of the content server identifier is based on the data communications identifier when the domain name field of the domain name service request does not include the flag.

10. A content distribution system according to claim 1, wherein the domain name service server comprises:

an interface which is capable of communicating with the data communications device; and a controller coupled to the interface, wherein the controller includes:

means for receiving the second domain name service request from the data communications device through the interface, the domain name service request including a data communications device identifier which identifies the data communications device, means for parsing a domain name field of the second domain name service request to determine whether the domain name field has a first contents or a second contents, the first contents being solely a host domain name that can be resolved into a corresponding network address, the second contents being solely a concatenated value including the host domain name and a client identifier identifying the client, such that the concatenated value does not represent a domain name that can be resolved into a corresponding network address;

means for selecting the content server identifier from a predetermined group of content server identifiers based on (i) the client identifier which identifies the client when the domain name field of the domain name service request includes the second contents, and (ii) the data communications device identifier when the domain name field of the domain name service request includes the first contents, and means for providing the domain name service response to the data communications device through the interface, the domain name service response having the selected content server identifier which identifies a content server.

11. A method according to claim 5, further comprising the steps of:
- receiving the second domain name service request which includes a data communications device identifier identifying a data communications device;
- parsing a domain name field of the second domain name service request to determine whether the domain name field has a first contents or a second contents, the first contents being solely a host domain name that can be resolved into a corresponding network address, the second contents being solely a concatenated value including the host domain name and a client identifier identifying the client, such that the concatenated value does not represent a domain name that can be resolved into a corresponding network address;
- selecting a content server identifier from a predetermined group of content server identifiers based on (i) the client identifier which identifies the client when the domain name field of the second domain name service request includes the second contents, and (ii) the data communications device identifier when the domain name field of the second domain name service request includes the first contents; and
- providing the domain name service response having the selected content server identifier which identifies the content server.

12. The method of claim 11 wherein the step of selecting the content server identifier includes the step of:
- determining whether the domain name field of the second domain name service request includes a flag indicating that the domain name field includes the client identifier such that (i) selection of the content server identifier is based on the client identifier when the domain name field of the second domain name service request includes the flag, and (ii) selection of the content server identifier is based on the data communications identifier when the domain name field of the second domain name service request does not include the flag.

13. A data communications device according to claim 2, wherein the concatenated value has the form of CLIENT_ID.DOMAIN_NAME in which CLIENT_ID represents the client identifier and DOMAIN_NAME represents the host domain name.

14. A data communications device according to claim 13, wherein the client identifier is in the form of a numerical Internet address.

15. A content distribution system according to claim 8, wherein the concatenated value has the form of CLIENT_ID.DOMAIN_NAME in which CLIENT_ID represents the client identifier and DOMAIN_NAME represents the host domain name.

16. A content distribution system according to claim 15, wherein the client identifier is in the form of a numerical Internet address.

* * * * *